(12) United States Patent
Hutto

(10) Patent No.: US 11,414,146 B2
(45) Date of Patent: Aug. 16, 2022

(54) ADJUSTABLE BICYCLE FRAME TO ENABLE FRONT WHEEL ELEVATION

(71) Applicant: Arne Todd Hutto, Edgewater, FL (US)

(72) Inventor: Arne Todd Hutto, Edgewater, FL (US)

( * ) Notice: Subject to any disclaimer, the term of this patent is extended or adjusted under 35 U.S.C. 154(b) by 210 days.

(21) Appl. No.: 16/192,084

(22) Filed: Nov. 15, 2018

(65) Prior Publication Data

US 2019/0144059 A1    May 16, 2019

Related U.S. Application Data

(60) Provisional application No. 62/586,435, filed on Nov. 15, 2017.

(51) Int. Cl.
*B62H 7/00* (2006.01)
*B62H 1/10* (2006.01)
*B62J 25/06* (2020.01)

(52) U.S. Cl.
CPC ............ *B62H 7/00* (2013.01); *B62H 1/10* (2013.01); *B62J 25/06* (2020.02)

(58) Field of Classification Search
CPC ..... B62H 1/00; B62H 7/00; B62H 1/12; B62J 25/00; A63C 17/22; A63C 17/06; B62K 1/00
USPC .... 280/291, 293, 301, 165, 163, 205, 288.1; 301/5.301, 5.302, 5.303; D12/120, 121, D12/605; 74/564
See application file for complete search history.

(56) References Cited

U.S. PATENT DOCUMENTS

| | | | |
|---|---|---|---|
| 586,040 A * | 1/1897 | Judge | |
| 586,335 A * | 7/1897 | Irby | |
| 946,037 A * | 1/1910 | Harley | |
| 993,567 A * | 5/1911 | Stickelbaut | |
| 1,118,679 A * | 11/1914 | Pawsat | B62J 25/00 280/291 |
| 1,176,673 A * | 3/1916 | Fox | B62J 25/00 280/291 |
| 3,284,096 A * | 11/1966 | Hansen | B62H 1/10 280/304.3 |
| 3,288,490 A * | 11/1966 | Jensen | B62J 7/00 280/202 |
| 3,321,047 A | 5/1967 | Ryan et al. | |
| 3,746,392 A * | 7/1973 | German | B62J 1/16 297/380 |
| 3,777,835 A * | 12/1973 | Bourne | A63B 19/02 180/10 |
| 3,888,511 A * | 6/1975 | Parrilla | B62H 1/12 280/239 |
| 3,961,810 A | 6/1976 | Arico | |
| 3,997,185 A | 12/1976 | Parrilla | |
| 4,012,054 A | 3/1977 | Moore | |

(Continued)

*Primary Examiner* — Anne Marie M Boehler

(57) ABSTRACT

A rear fork of a bicycle frame. The rear fork includes a base, a first arm, and a second arm. Each of the first arm and the second arm extend rearward from the base. At least one wheelie step is coupled to the rear fork. The wheelie step includes an extension rotatably coupled to and extending from one of the first arm and the second arm, and a foot step coupled to the extension. The extension is configured to rotate along an axis extending in a direction from the first arm to the second arm. A lock is configured to lock the extension to the one of the first arm and the second arm at different rotational positions along the axis.

9 Claims, 4 Drawing Sheets

(56) References Cited

U.S. PATENT DOCUMENTS

| | | | |
|---|---|---|---|
| 4,109,741 A * | 8/1978 | Gabriel | B62K 1/00 |
| | | | 180/21 |
| 4,153,268 A | 5/1979 | Wilson et al. | |
| 4,154,452 A | 5/1979 | Newman | |
| 4,353,571 A | 10/1982 | Anderson | |
| 4,367,883 A | 1/1983 | Anderson | |
| 4,733,881 A * | 3/1988 | Mueller | B62K 3/02 |
| | | | 280/281.1 |
| 5,330,221 A | 7/1994 | Sutton | |
| 5,927,801 A * | 7/1999 | Miree | B62J 1/167 |
| | | | 297/195.1 |
| 6,149,179 A * | 11/2000 | Long | B62H 1/00 |
| | | | 280/288.4 |
| 6,406,046 B1 * | 6/2002 | Harrell | B62J 1/14 |
| | | | 224/415 |
| 7,163,225 B2 | 1/2007 | Honea | |
| 7,607,693 B2 * | 10/2009 | Chavis | B62J 27/00 |
| | | | 280/293 |
| 7,762,569 B2 * | 7/2010 | Fraser | B62K 19/36 |
| | | | 280/205 |
| 8,075,011 B1 | 12/2011 | Duzzny | |
| 8,382,139 B2 * | 2/2013 | Schexnayder | B62H 7/00 |
| | | | 280/293 |
| 2003/0001349 A1 | 1/2003 | Eschenbach | |
| 2003/0132592 A1 | 7/2003 | Dombroski | |
| 2005/0275189 A1 | 12/2005 | Giordanella et al. | |
| 2014/0028079 A1 | 1/2014 | Wesling et al. | |
| 2018/0001951 A1 * | 1/2018 | May | B62J 25/00 |

\* cited by examiner

US 11,414,146 B2

ADJUSTABLE BICYCLE FRAME TO ENABLE FRONT WHEEL ELEVATION

CROSS-REFERENCE TO RELATED APPLICATION

This application claims the benefit of priority of U.S. provisional application No. 62/586,435, filed Nov. 15, 2017, the contents of which are herein incorporated by reference.

BACKGROUND OF THE INVENTION

The present invention relates to a bicycle frame and, more particularly, to an adjustable bicycle frame to enable front wheel elevation.

A bicycle, also called a cycle or bike, is a human-powered or motor-powered, pedal-drive, single-track vehicle, having two wheels attached to a frame, one behind the other. In vehicle acrobatics, a wheelie, or wheelstand, is a vehicle maneuver in which the front wheel or wheels come off the ground due to sufficient torque being applied to the rear wheel or wheels, or rider motion relative to the vehicle. Wheelies are a recreational activity and are generally considered fun to do.

As can be seen, there is a need for a bicycle frame that allows users to pop and hold wheelies for a longer period of time.

SUMMARY OF THE INVENTION

In one aspect of the present invention, a rear fork of a bicycle frame comprises: a base; a first arm and a second arm each extending rearward from the base; at least one wheelie step comprising an extension rotatably coupled to and extending from one of the first arm and the second arm, and a foot step coupled to the extension, wherein the extension is configured to rotate along an axis extending in a direction from the first arm to the second arm; and a lock configured to lock the extension to the one of the first arm and the second arm at different rotational positions along the axis.

In another aspect of the present invention, a rear fork of a bicycle frame comprises: a base; a first arm and a second arm each extending in a rearward direction from the base; a rear axle extending from the first arm to the second arm; and at least one wheelie step comprising an extension extending from one of the first arm and the second arm in the rearward direction beyond the rear axle, and a foot step coupled to a distal end of the extension and substantially perpendicular to the extension.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
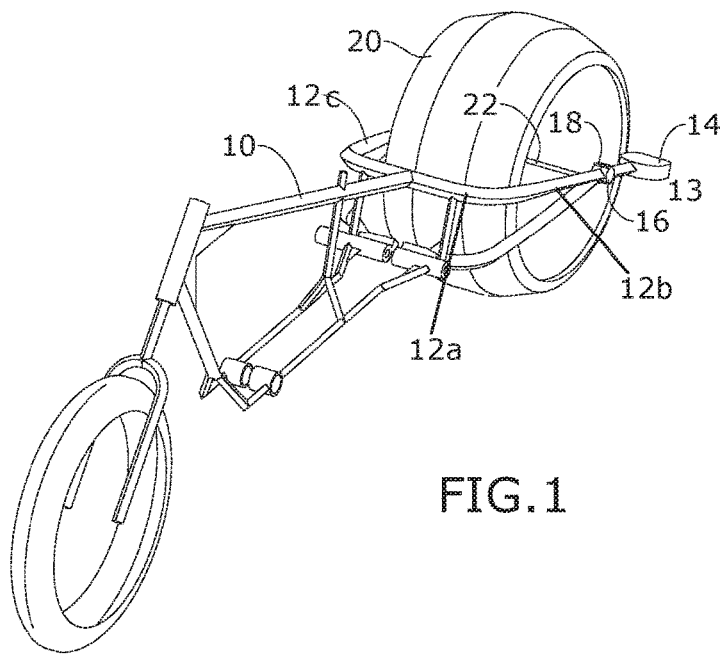
FIG. 1 is a perspective view of an embodiment of the present invention.
Figure 2:
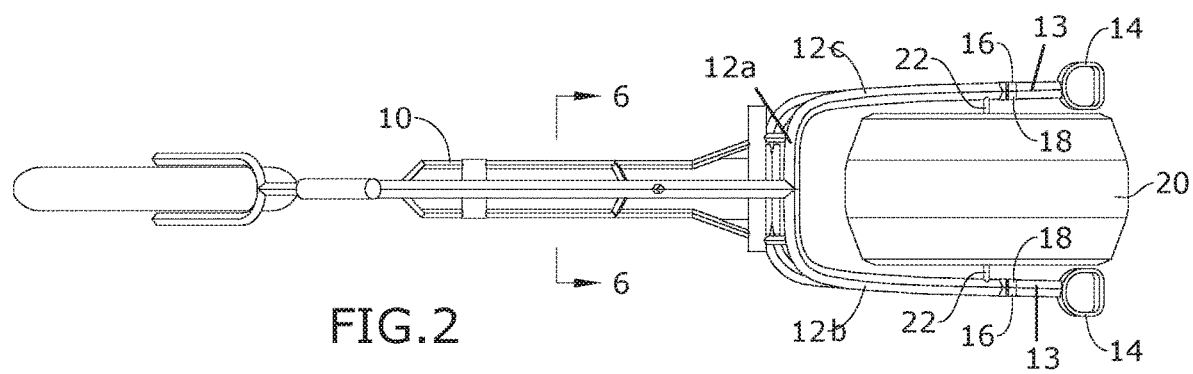
FIG. 2 is a top view of an embodiment of the present invention.
Figure 3:
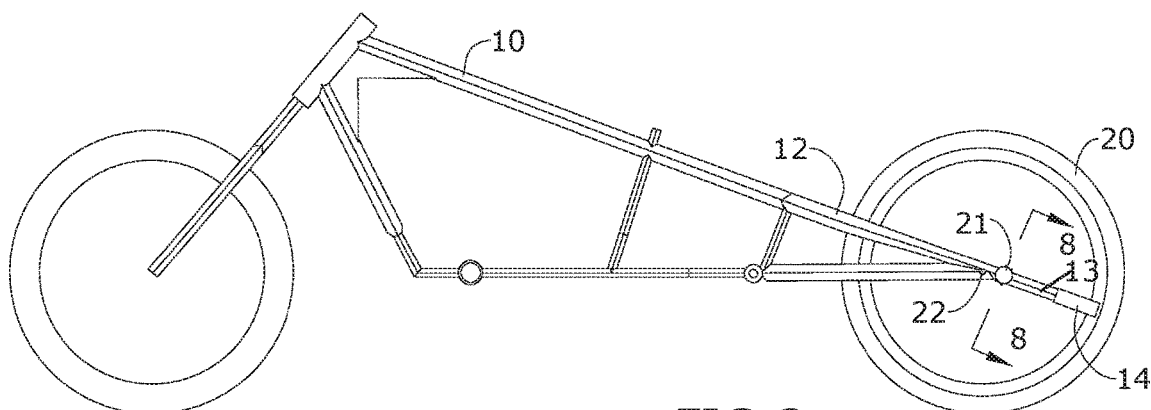
FIG. 3 is a side view of an embodiment of the present invention.
Figure 4:
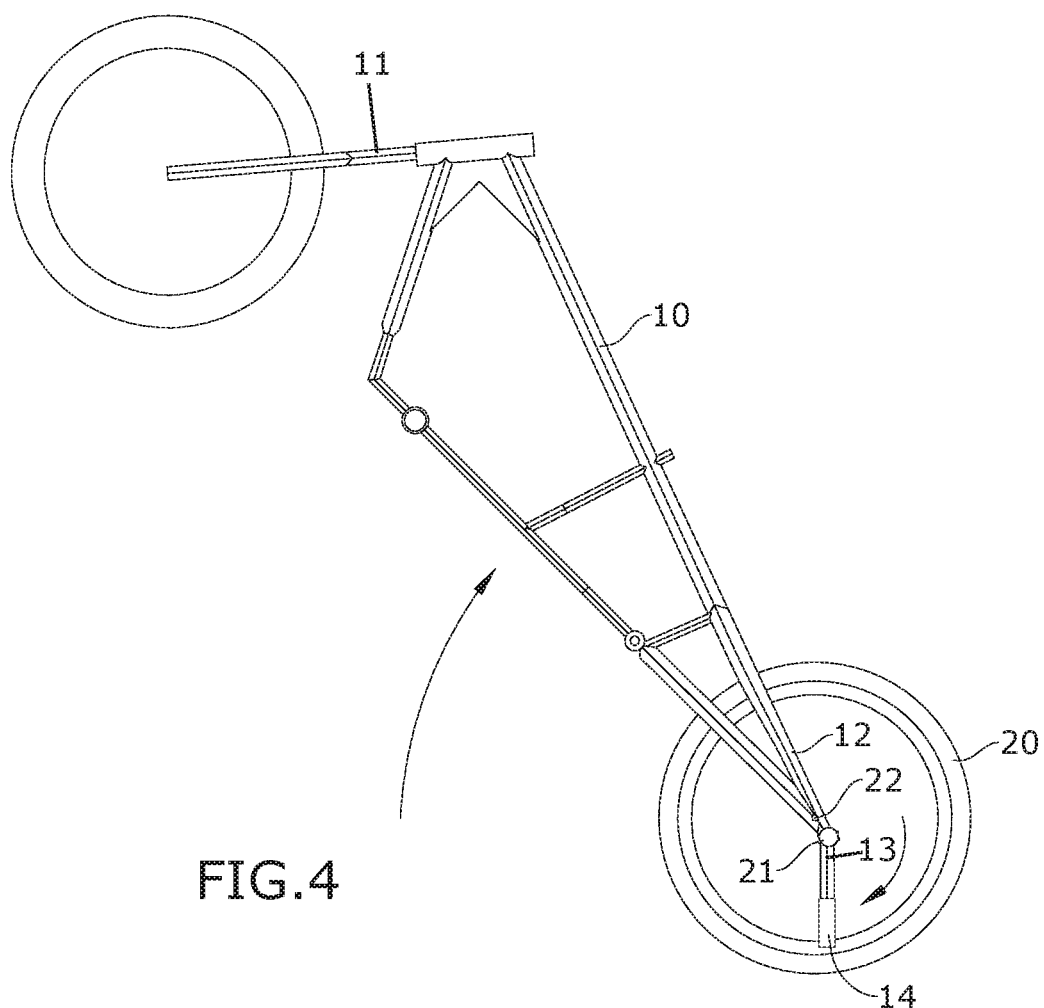
FIG. 4 is a side view of an embodiment of the present invention, illustrating upward rotation of the frame when weight is applied to the foot supports.
Figure 5:
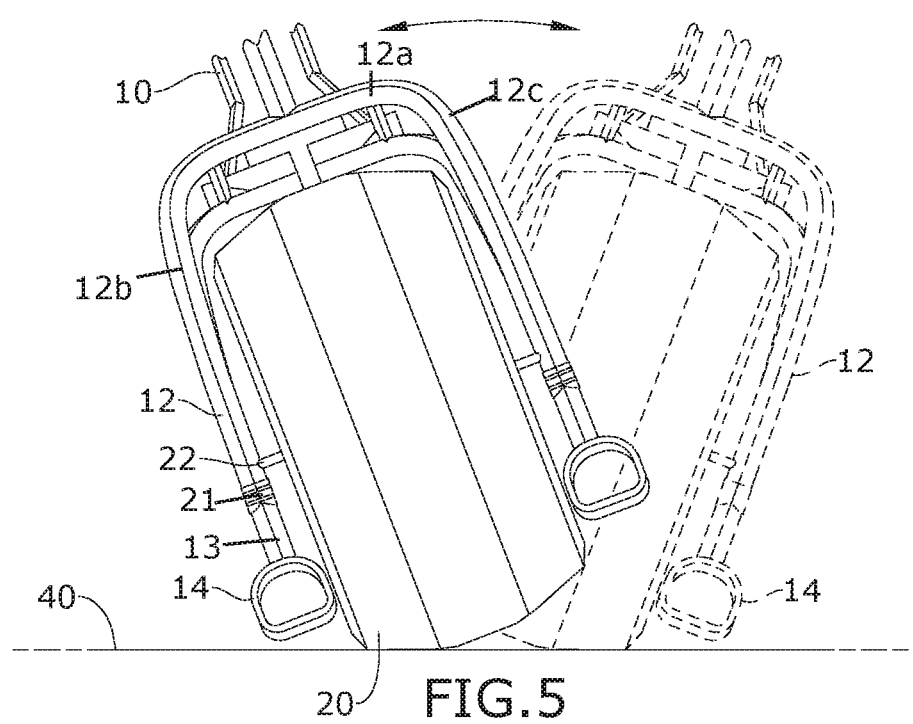
FIG. 5 is a rear view of an embodiment of the present invention, illustrating a wide side stability of the rear wheel.
Figure 6:
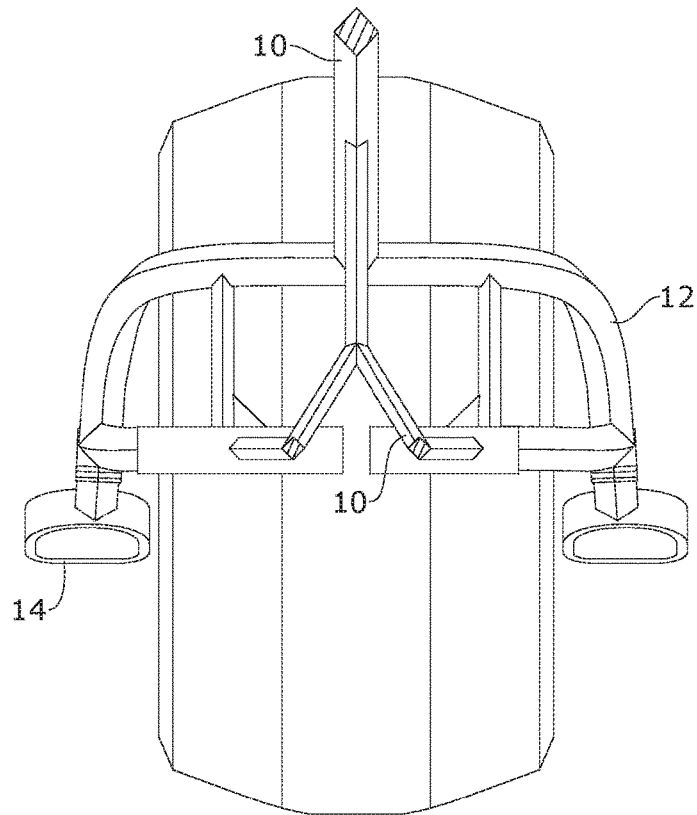
FIG. 6 is a section view of the present invention taken along line 6-6 in FIG. 2.
Figure 7:
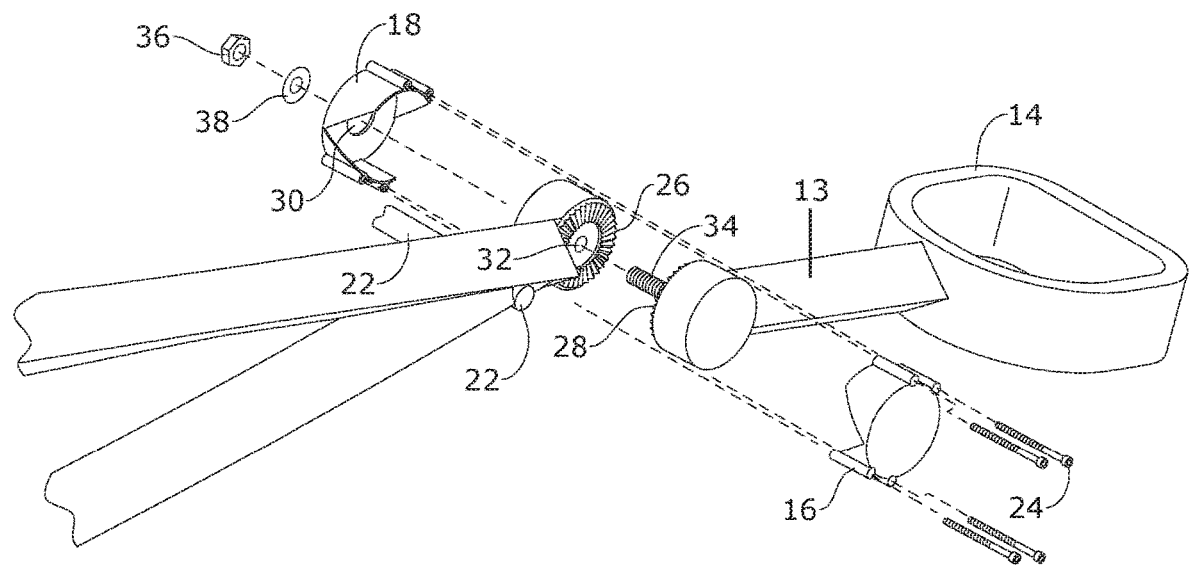
FIG. 7 is an exploded view of an embodiment of the present invention.
Figure 8:
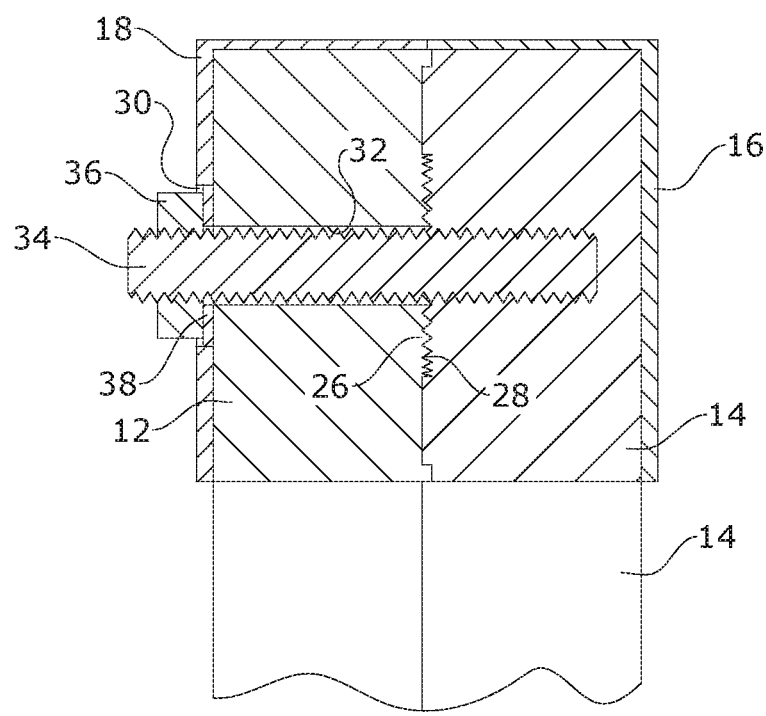
FIG. 8 is a section view of the present invention taken along line 8-8 in FIG. 3.
Figure 9:
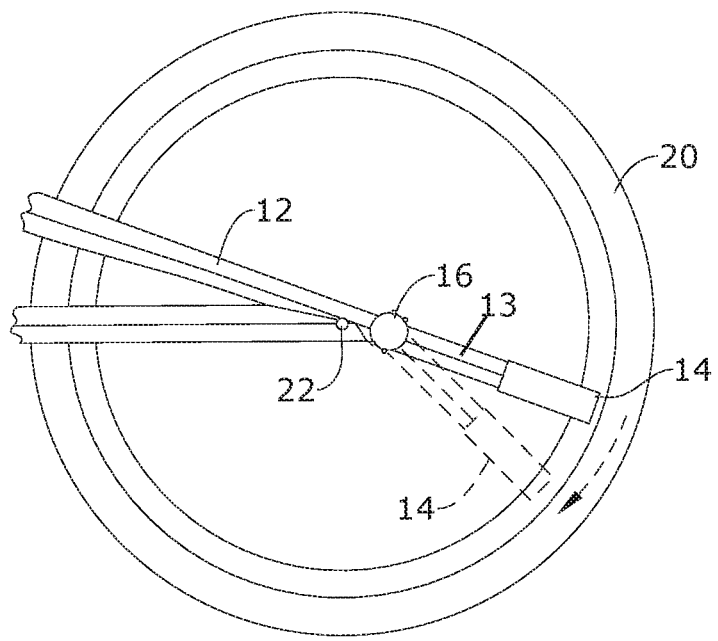
FIG. 9 is a side view of an embodiment of the present invention illustrating adjustments of the foot supports.

Referring to FIGS. 1 through 9, the present invention includes a rear fork 12 of a bicycle frame 10. The rear fork 12 includes a base 12a, a first arm 12b, and a second arm 12c. Each of the first arm 12b and the second arm 12c extend rearward from the base 12a. At least one wheelie step 13, 14 is coupled to the rear fork 12. The wheelie step 13, 14 includes an extension 13 rotatably coupled to and extending from one of the first arm 12a and the second arm 12b, and a foot step 14 coupled to the extension 13. The extension 13 is configured to rotate along an axis extending in a direction from the first arm 12b to the second arm 12c. A lock 21 is configured to lock the extension 13 to the one of the first arm 12b and the second arm 12c at different rotational positions along the axis.

In certain embodiments, the at least one wheelie step 13, 14 includes a first wheelie step 13, 14 having a first extension 13 rotatably coupled to the first arm 12b and a first foot step 14 coupled to the first extension 13 and a second wheelie step 13, 14 having a second extension 13 rotatably coupled to the second arm 12c and a second foot step 14 coupled to the second extension 13. The extensions 13 may be rotatably coupled to distal ends of the first arm 12b and the second arm 12c. The foot steps 14 may each be in the shape of a stirrup.

In certain embodiments, the lock 21 may include a main clamp. The main clamp includes a plurality of first teeth 26 radially disposed about the distal ends of the arms 12b, 12c and a plurality of second teeth 28 radially disposed about the extensions 13. The plurality of first teeth 26 interlock with the plurality of second teeth 28 at the different rotational positions. A threaded bolt 34 extends from the extensions 13, and passes through openings 32 formed through the distal ends of the arms 12b, 12c. A female threaded nut 36 and a washer 38 mechanically couple to the threaded bolt 34 to secure the interlocked plurality of first teeth 26 and plurality of second teeth 28 together.

The present invention may further include clamp covers 16, 18. The clamp covers 16, 18 includes male clamp covers 16 that fit around the extensions 14 and female clamp covers 18 that fit around the distal ends. The female clamp covers 18 may include openings 30 for the threaded bolts 34 to pass through. The male clamp covers 16 and the female clamp covers 18 include aligning openings. The openings of at least the female clamp covers 18 are threaded. Threaded bolts 24 are driven through the aligning openings to clamp the male clamp covers 16 to the female clamp covers 18.

The present invention may include the bicycle frame 10. The bicycle frame 10 may be part of a human powered or motorized bicycle. The bicycle frame 10 includes a main body having a front and a rear. A front fork 11 extends from the front of the main body, and the rear fork 12 extends from the rear of the main body. The rear fork 12 may include a rear axle 22 extending from the first arm 12b to the second arm 12c. A wide and stabilizing back wheel 20 may be rotatably coupled to the rear axle 22 of the bicycle rear fork 12. The wheel 20 includes a cylinder shaped main portion and a pair of frusto conical side portions extending from opposing sides of the cylinder shaped main portion. The wheel 20 allows users to turn easily while popping wheelies when riding on a surface 40.

To use the present invention, the user may remove the male clamp covers 16 and the female clamp covers 18 from the main clamp. The user's may then loosen the main clamps by loosening the female threaded nuts 36. The extensions 13 may then rotate relative to the arms 12b, 12c, allowing the user to adjust the wheelie steps 13, 14 to their desired angle. Once adjusted, the user may then tighten the female threaded nuts 36 and reattached the male clamp covers 16 to the female clamp cover 18. The user may then place their feet within the foot steps 14 and raise the front end of the bicycle to perform prolonged wheelies. The wide back wheel 20 allows the user to turn while performing the wheelies.

It should be understood, of course, that the foregoing relates to exemplary embodiments of the invention and that modifications may be made without departing from the spirit and scope of the invention as set forth in the following claims.

What is claimed is:

1. A rear fork of a bicycle frame comprising:
   a base;
   a first arm and a second arm each extending rearward from the base;
   a rear axle extending from the first arm to the second arm;
   a wheel rotatably coupled to the rear axle; and
   at least one wheelie step comprising an extension rotatably coupled to and extending from one of the first arm and the second arm, and a foot step coupled to the extension, wherein a distal end of the foot step is inward of an outer diameter of the wheel, and wherein the foot step extends rearward from and in longitudinal alignment with the extension.

2. The rear fork of claim 1, wherein the extension is rotatably coupled to a distal end of one of the first arm and the second arm, and wherein the distal end of the one of the first arm and the second arm is rearward of the rear axle.

3. The rear fork of claim 1 wherein each arm has an upper portion extending in a rearward direction, and wherein the extension extends colinear with said rearward direction.

4. The rear fork of claim 1, wherein the foot step is in the shape of a stirrup.

5. The rear fork of claim 1, further comprising:
   a lock configured to lock the extension to the one of the first arm and the second arm at different rotational positions.

6. The rear fork of claim 1, wherein a longitudinal axis of the foot step extends in said rear axis.

7. The rear fork of claim 6, wherein the wheel comprises a cylinder shaped main portion and a pair of frusto conical side portions extending from opposing sides of the cylinder shaped main portion.

8. The bicycle frame comprising a main body having a front and a rear, a front fork extending from the front of the main body, and the rear fork of claim 1 extending from the rear of the main body.

9. The rear fork of claim 1, wherein the extension is configured to selectively rotate along an axis extending in a direction from the first arm to the second arm.

* * * * *